United States Patent Office 3,218,317
Patented Nov. 16, 1965

3,218,317
ESTERS OF 6-HYDROXY-17-ETHYLENEDIOXY-3α,5α-CYCLOANDROSTANE
John S. Tadanier, Chicago, and John Wayne Cole, Deerfield, Ill., assignors to Abbott Laboratories, North Chicago, Ill., a corporation of Illinois
No Drawing. Filed June 27, 1962, Ser. No. 205,545
5 Claims. (Cl. 260—239.55)

The present invention relates to new steroids and the process of their manufacture. In particular, this invention rlates to esters of 6-hydroxy-17-ethylenedioxy-3α,5α-cycloandrostane having the general formula

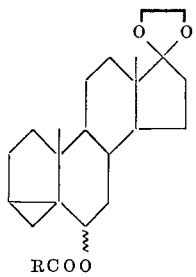

wherein R represents loweralkyl, phenyl or nitrophenyl. The wavy line shown in this formula and others hereinafter indicates that the 6-substituent may be in either the α- or β-position.

The new esters are useful therapeutically, due to their hormonal catvities. In particular, they show anti-androgenic activity with secondary effects on muscle growth. Anti-androgens are used for repressing certain endocrine tumors, e.g. prostate tumors, and in the treatment of endocrine defects, e.g. hirsutism. The need for substances of this type of activity has been discussed by Dorfman in Acta Endocrinologica, vol. 33, page 308 (1960), and elsewhere.

The starting materials for making the compounds of the present invention are the two stereoisomers of 6-hydroxy-17-ethylenedioxy-3α,5α-cycloandrostane. The 6β-hydroxy compound is made according to the procedure described by Julia et al. in Bull. Soc. Chim. Fr., page 297 (1960). The 6α-epimer is obtained by reducing the corresponding 6-keto compound (cf. Julia et al.) with lithium aluminum hydride.

In a simple embodiment, the esters of the present invention are made from a 6-hydroxy-17-ethylenedioxy-3α,5α-cycloandrostane and the acid chloride or the anhydride of the desired carboxylic acid in the presence of pyridine. Such a reaction can be carried out at room temperature but, preferably, somewhat elevated temperatures are used. The useful temperature range for this process is between about 10° C. and about 100° C. Although the reaction theoretically requires one mole of the acid chloride or anhydride to be used and one mole of the hydroxysteroid, an excess of the acid chloride or anhydride is preferred.

Since the new steroid esters are unstable under acidic conditions, i.e. in the presence of free acids, the process of the present invention is carried out in the presence of a weak, inert base, e.g. pyridine. In contrast to other acylation reactions, the instant process thus requires the presence of pyridine both as a catalytic agent and to bind all free acid formed by the above reaction and is preferably used in considerable excess of the calculated amount. Since even large amounts have no detrimental effects, pyridine may be used as the reaction solvent.

To better illustrate the process of the present invention, reference is made to the following examples which are not intended to limit the invention in any form since various modifications of the procedural steps will immediately be apparent to those skilled in the art.

EXAMPLE 1

*6β-acetoxy-17-ethylenedioxy-3α,5α-cycloandrostane*

A solution prepared from 789 mg. of 6β-hydroxy-17-ethylenedioxy-3α,5α-cycloandrostane, 4.0 ml. of acetic anhydride, and 20 ml. of pyridine is heated on a steam bath for 4 hours. The solution is then cooled to room temperature and shaken with 200 ml. of water and 200 ml. of ether. The aqeous phase is separated and extracted with 200 ml. of ether. The ether solutions are washed in series with six 150-ml. portions of water, combined and dried over anhydrous magnesium sulfate. After evaporation of the ether on a steam bath and removal of the residual pyridine under aspirator pressure on a steam bath using a rotary evaporator, the residue is dissolved in 20 ml. of pentane and the resulting solution is treated with charcoal to remove an orange coloration. The filtered solution is stripped of solvent and the residue is recrystallized from methanol/water to yield 722 mg. of 6β-acetoxy-17-ethylenedioxy-3α,5α-cycloandrostane, melting at 110–111° C. An analytical sample recrystallized from methanol/water melts at 112–112.5° C., has a $[\alpha]_D^{22}$ of +18.5° as a 1% solution in chloroform, and has analytical values of 73.88% C. and 9.14% H, which corresponds to the values calculated for the empirical formula $C_{23}H_{34}O_4$.

EXAMPLE 2

*6β-p-nitrobenzoyloxy-17-ethylenedioxy-3α,5α-cycloandrostane*

To a solution of 404 mg. of 6β-hydroxy-17-ethylenedioxy-3α,5α-cycloandrostane in 5 ml. of pyridine is added 458 mg. of p-nitrobenzoyl chloride. The reaction mixture is allowed to stand at room temperature for 5 hours and is then poured into 50 ml. of water. The crystalline solid which separates is collected on a sintered glass funnel. This product is dissolved in 300 ml. of ether and the ether solution is washed with 100 ml. of water and the aqueous phase is extracted with 200 ml. of ether. The ether solutions are washed in series with two 100-ml. portions of a 5% aqueous sodium bicarbonate solution and three 100-ml. portions of water. The ether solutions are combined, dried over anhydrous magnesium sulfate, and the solution is then concentrated to a volume of 80 ml. This solution is placed on a column of 20 grams of neutral alumina of activity 111. Elution of this chromatographic column with 200 ml. of ether produces 564 mg. of 6β-p-nitrobenzoyloxy-17-ethylenedioxy-3α,5α-cycloandrostane, melting at 186–189° C. An analytical sample recrystallized twice from benzene/Skellysolve B melts at 187–189° C., has a $[\alpha]_D^{22}$ of +16.8° (1% chloroform), and has analytical values of 70.03% C and 7.39% H which correspond closely with the calculated values for the empirical formula $C_{28}H_{35}NO_6$.

When, in the above example, p-nitrobenzoyl chloride is replaced with 334 mg. of benzoyl chloride, the same procedure leads to a similar yield of 6β-benzoyloxy-17-ethylenedioxy-3α,5α-cycloandrostane.

EXAMPLE 3

*6β-propionoxy-17-ethylenedioxy-3α,5α-cycloandrostane*

A solution of 609 mg. of 6β-hydroxy-17-ethylenedioxy-3α,5α-cycloandrostane, 4 ml. of propionic anhydride and 18 ml. of pyridine is heated on a steam bath for 4 hours and subsequently left at room temperature overnight. The reaction mixture is worked up as described in Example 1, leaving an orange oil as the residue. This oil is chromatographed on a column of 60 grams of neutral alumina of activity 111. Elution with 450 ml. of ether/pentane (1:20) produces 540 mg. of an almost colorless oil. The latter is dissolved in 50 ml. of pentane, treated with charcoal, filtered, and the filtrate is stripped of solvent to leave 500.7 mg. of 6β-propionoxy-17-ethylenedioxy-3α,5α-cycloandrostane as an analytically pure oil which analyzes 74.20% C and 9.34% H, correspondingly closely with the calculated values for the compound with the empirical formula $C_{24}H_{36}O_4$.

EXAMPLE 4

6α-hydroxy-17-ethylenedioxy-3α,5α-cycloandrostane

A solution of 2.0 grams of 17-ethylenedioxy-3α,5α-cycloandrostan-6-one in 60 ml. of ether is added over a period of 30 minutes to a stirred slurry of 1 gram of lithium aluminum hydride in 80 ml. of ether. After completion of the addition, stirring is continued for 4 hours and the reaction mixture is then allowed to stand overnight at room temperature. The excess lithium aluminum hydride is decomposed by the addition of a solution prepared from 5 ml. of ethanol and 50 ml. of ether. The resulting mixture is shaken with a mixture of 250 ml. of ether and 250 ml. of water. The aqueous phase containing undissolved metal hydroxides is separated and extracted with 300 ml. of ether. The ether solutions are washed in series with six 200-ml. portions of water, combined, and dried over anhydrous magnesium sulfate. The ether is evaporated, leaving crude 6α-hydroxy-17-ethylenedioxy-3α,5α-cycloandrostane as a white opaque glass.

EXAMPLE 5

6α-acetoxy-17-ethylenedioxy-3α,5α-cycloandrostane

A solution prepared from 1.09 grams of the crude 6α-hydroxy-17-ethylenedioxy - 3α,5α - cycloandrostane of Example 4, 30 ml. of pyridine and 8 ml. of acetic anhydride is allowed to stand at room temperature for 20 hours. The product is worked up as described in Example 1. After evaporating the ether and pyridine, the residue is taken up in 250 ml. of ether and the ether solution is dried over anhydrous magnesium sulfate. The ether is evaporated whereupon the residue crystallizes on standing to yield 1.2 grams of 6α-acetoxy-17-ethylenedioxy-3α,5α-cycloandrostane melting at 105–111° C. This compound is recrystallized from ether/pentane to produce an analytical sample showing a melting point of 111–113° C., a $[\alpha]_D^{22}$ of +69° (1% chloroform); it analyzes 73.89% C, and 9.42% H, which correspond to the calculated values for the empirical formula $C_{23}H_{34}O_4$.

By replacing the above acetic anhydride with isobutyryl chloride and allowing the reaction to take place within a period of 10 hours at about 50° C., the corresponding 6α - isobutyryloxy-17-ethylenedioxy-3α,5α - cycloandrostane is obtained at otherwise identical conditions and work-up procedure.

EXAMPLE 6

6α-p-nitrobenzoyloxy-17-ethylenedioxy-3α,5α-cycloandrostane

A solution prepared from 408 mg. of crude 6α-hydroxy-17-ethylenedioxy-3α,5α-cycloandrostane from Example 4, 462 mg. of p-nitrobenzoyl chloride and 5 ml. of pyridine is allowed to stand at room temperature for 90 minutes. The product is worked up by ether extraction as described in Example 2 and eluted through a chromatographic column containing 20 grams of neutral alumina of activity 111 with 250 ml. of ether. The ether is evaporated and the residue is recrystallized from benzene/Skellysolve B to yield 363 mg. of 6α-p-nitrobenzoyloxy-17-ethylenedioxy-3α,5α-cycloandrostane melting at 168–169° C. For analysis, the compound is recrystallized from benzene/Skellysolve B and shows a melting point of 168–170° C., has a $[\alpha]_D^{26}$ of +60.5° (1% chloroform), and shows 70.02% C and 7.36% H, corresponding to the calculated values for the empirical formula $C_{28}H_{35}NO_6$.

Others may practice the invention in any of the numerous ways which will be suggested by the present disclosure to one skilled in the art. All such practice of the invention is considered to be a part hereof provided it falls within the scope of the appended claims.

We claim:
1. Steroids of the formula

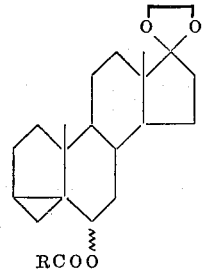

wherein R is selected from the group consisting of loweralkyl, phenyl, and nitrophenyl.
2. 6-acetoxy-17-ethylenedioxy-3α,5α-cycloandrostane.
3. 6 - propionoxy - 17-ethylenedioxy-3α,5α-cycloandrostane.
4. 6 - benzoyloxy - 17-ethylenedioxy-3α,5α-cycloandrostane.
5. 6 - p-nitrobenzoyloxy-17-ethylenedioxy-3α,5α-cycloandrostane.

References Cited by the Examiner

UNITED STATES PATENTS 2,673,867    3/1954    Spero et al. _____ 260—397.45
3,060,201    10/1962   Camerino et al. _____ 260—397.4
3,071,580    1/1963    Holmlund et al. ___ 260—239.55

OTHER REFERENCES

Julia et al.: Bull. Soc. Chim. France (1960), pp 297–299.

LEWIS GOTTS, *Primary Examiner.*